(12) United States Patent
Jager et al.

(10) Patent No.: US 11,042,513 B2
(45) Date of Patent: Jun. 22, 2021

(54) EXTENDED TAGGING METHOD AND SYSTEM

(71) Applicant: International Business Machines Corporation, Armonk, NY (US)

(72) Inventors: Izidor Jager, Boeblingen (DE); Michael Junginger, Boeblingen (DE); Andreas Nauerz, Boeblingen (DE); Thomas Steinheber, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2095 days.

(21) Appl. No.: 13/733,207

(22) Filed: Jan. 3, 2013

(65) Prior Publication Data
US 2013/0173671 A1    Jul. 4, 2013

(30) Foreign Application Priority Data

Jan. 3, 2012  (EP) .................................... 12150039

(51) Int. Cl.
*G06F 16/21*     (2019.01)
*G06F 16/9535*   (2019.01)
*G06F 16/907*    (2019.01)

(52) U.S. Cl.
CPC ............ *G06F 16/21* (2019.01); *G06F 16/907* (2019.01); *G06F 16/9535* (2019.01)

(58) Field of Classification Search
CPC ........... G06F 21/6218; G06F 17/30292; Y10S 707/948
USPC ......................................... 707/803, 783, 948
See application file for complete search history.

(56) References Cited

U.S. PATENT DOCUMENTS

| | | | |
|---|---|---|---|
| 7,076,463 B1 * | 7/2006 | Boies et al. ..................... | 705/39 |
| 7,100,152 B1 * | 8/2006 | Birum et al. .................. | 717/131 |
| 7,930,629 B2 | 4/2011 | Hurst-Hiller et al. | |
| 7,984,076 B2 * | 7/2011 | Kobayashi et al. .......... | 707/803 |
| 8,001,125 B1 | 8/2011 | Magdalin et al. | |
| 8,024,312 B2 | 9/2011 | Wang et al. | |
| 8,131,762 B2 * | 3/2012 | Smetters et al. ............. | 707/781 |
| 8,132,151 B2 * | 3/2012 | Ahern et al. .................. | 715/205 |
| 2001/0029567 A1 | 10/2001 | Ando et al. | |

(Continued)

OTHER PUBLICATIONS

Farrell, S. et al., "Socially augmenting employee profiles with people tagging," In Proc. of 20th ACM Sym. on User Interface Software and Technology, UIST 2007, pp. 91-100, Oct. 7-10, 2007.

(Continued)

*Primary Examiner* — Jensen Hu
(74) *Attorney, Agent, or Firm* — Cuenot, Forsythe & Kim, LLC

(57) ABSTRACT

Tagging a resource in a network with a tag belonging to a tag type includes creating, using a processor, a tag and relating the tag to the resource, categorizing the tag into a tag type, registering the tag type in a registry, associating tag type attributes to the tag type, associating a subset of the tag type attributes of the tag type to the tag, and associating a tag type attribute value to each member of the subset of the tag type attributes of the tag. The tag, the tag type, the subset of tag type attributes of the tag, and associated tag type attribute values are stored. Using the processor, a dynamically linkable executable program logic is triggered based on the subset of tag type attributes and the tag type attribute values.

18 Claims, 6 Drawing Sheets

(56) References Cited

U.S. PATENT DOCUMENTS

| | | | |
|---|---|---|---|
| 2002/0129331 A1* | 9/2002 | Zhang et al. | 717/106 |
| 2003/0234718 A1* | 12/2003 | Fujisawa | G06Q 20/203 |
| | | | 340/5.1 |
| 2006/0242139 A1* | 10/2006 | Butterfield | G06F 16/58 |
| 2008/0288541 A1 | 11/2008 | Venturini | |
| 2009/0012991 A1* | 1/2009 | Johnson | G06F 16/24573 |
| 2009/0265631 A1 | 10/2009 | Sigurbjornsson et al. | |
| 2010/0153837 A1* | 6/2010 | Bellessort et al. | 715/234 |
| 2011/0029567 A1 | 2/2011 | Banda et al. | |
| 2011/0077936 A1* | 3/2011 | Arumugam | G06F 40/117 |
| | | | 704/9 |
| 2011/0125760 A1 | 5/2011 | Frieden et al. | |
| 2011/0213840 A1 | 9/2011 | Boyer et al. | |
| 2012/0072845 A1* | 3/2012 | John et al. | 707/737 |
| 2012/0265735 A1* | 10/2012 | McMillan | H04N 21/44204 |
| | | | 707/687 |

OTHER PUBLICATIONS

Thakker, B.,"Tagging and rating WCM content," IBM Software Group, Aug. 2010, © International Business Machines Corporation 2010, 7 pgs.

* cited by examiner

EXTENDED TAGGING METHOD AND SYSTEM

CROSS-REFERENCE TO RELATED APPLICATIONS

This application claims the benefit of European Application Number 12150039.1 filed on Jan. 3, 2012, which is fully incorporated herein by reference.

BACKGROUND

In recent years web-based systems, such as Enterprise Information Portals, have gained importance in the industry. These systems integrate, as a single point of access, various applications and processes into one homogeneous user interface.

Today, such systems allow access to a huge amount of content of different types and sources. They are no longer exclusively maintained by an IT department. Instead, Web 2.0 techniques are used increasingly across-the-board, allowing user generated content to be added. These systems grow quickly and in a more uncoordinated way as different users have different knowledge and expertise and obey different mental models.

The continuous growth may make access to actually relevant information more difficult. Users need to find task- and role-specific information quickly, but face information overload.

Thus, users may often miss out on resources that are potentially relevant to their tasks, simply because they never come across them. On the one hand, users obtain too much information that is not relevant to them. Generally speaking, it may become cumbersome to find the right information at the right time.

The recent popularity of collaboration techniques on the Internet, particularly tagging and rating, provide new means for both, semantically describing portal content as well as for reasoning about users' interests, preferences and contexts.

Conventionally, tagging systems may be used for categorizing resources in a network but classically belong to the two fixed groups of private and public tags.

Thus, there may be a need for a more sophisticated management of tags allowing a much wider range for controlling of tag behaviors.

BRIEF SUMMARY

A method of tagging a resource in a network with a tag belonging to a tag type includes creating, using a processor, a tag and relating the tag to the resource, categorizing the tag into a tag type, registering the tag type in a registry, associating tag type attributes to the tag type, associating a subset of the tag type attributes of the tag type to the tag, and associating a tag type attribute value to each member of the subset of the tag type attributes of the tag. The method further includes storing the tag, the tag type, the subset of tag type attributes of the tag, and associated tag type attribute values and triggering, using the processor, a dynamically linkable executable program logic based on the subset of tag type attributes and the tag type attribute values.

A system for tagging a resource in a network with a tag belonging to a tag type includes a processor programmed to initiate executable operations. The executable operations include creating a tag and relating the tag to the resource, categorizing the tag into a tag type, registering the tag type in a registry, associating tag type attributes to the tag type, associating a subset of the tag type attributes of the tag type to the tag, and associating a tag type attribute value to each member of the subset of the tag type attributes of the tag. The executable operations also include storing the tag, the tag type, the subset of tag type attributes of the tag, and associated tag type attribute values and triggering a dynamically linkable executable program logic based on the subset of tag type attributes and the tag type attribute values.

A computer program product for tagging a resource in a network with a tag belonging to a tag type includes a computer readable storage medium having program code stored thereon. The program code is executable by a processor to perform a method. The method includes creating, using the processor, a tag and relating the tag to the resource, categorizing, using the processor, the tag into a tag type, registering, using the processor, the tag type in a registry, associating, using the processor, tag type attributes to the tag type, associating, using the processor, a subset of the tag type attributes of the tag type to the tag, and associating, using the processor, a tag type attribute value to each member of the subset of the tag type attributes of the tag. The method further includes storing, using the processor, the tag, the tag type, the subset of tag type attributes of the tag, and associated tag type attribute values and triggering, using the processor, a dynamically linkable executable program logic based on the subset of tag type attributes and the tag type attribute values.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
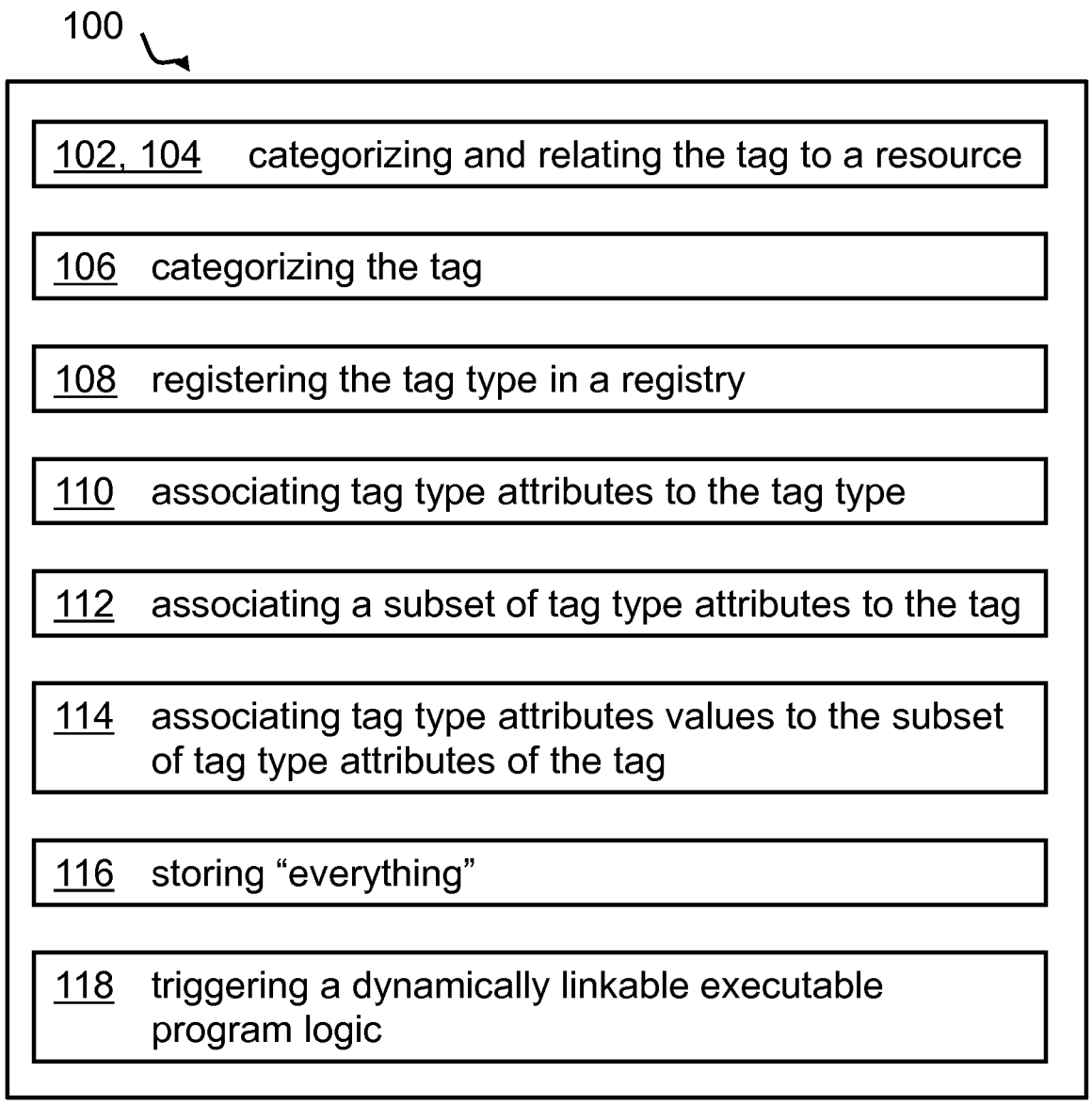
FIG. 1 shows a block diagram of an embodiment of the inventive method.

One or more embodiments of the invention relate generally to a method for tagging a resource in a network with a tag belonging to a tag type. One or more embodiments of the invention relate further to a tagging system for tagging a resource in a network with a tag belonging to a tag type, a computing system, a data processing program, and a computer program product.

This need may be addressed by a method for tagging of a resource in a network with a tag belonging to a tag type, a tagging system, a computing system, a data processing program, and a computer program product according to the independent claims.

According to one embodiment, a method for tagging a resource in a network with a tag belonging to a tag type may be provided. The tagging method may comprise creating a tag and relating the tag to the resource, categorizing the tag into a tag type, registering the tag type in a registry, associating tag type attributes to the tag type, associating a subset of the tag type attributes of the tag type to the tag, and associating tag type attribute values to each member of the subset of the tag type attributes of the tag. The method may also comprise storing the tag, the tag type, the subset of tag type attributes of the tag and associated tag type attribute values, and triggering a dynamically linkable executable program logic based on the subset of tag type attributes and the tag type attribute values.

According to another embodiment, a tagging system, in particular a tagging module, for tagging a resource in a network with a tag, belonging to a tag type, may be provided. The tagging system may comprise a user interface adapted for creating a tag and relating the tag to the resource. The user interface also may be adapted for categorizing the tag into a tag type, associating tag type attributes to the tag type, associating a subset of the tag type attributes of the tag type to the tag, and associating tag type attribute values to each member of the subset of the tag type attributes of the tag. The tagging system may also comprise a registry adapted for registering the tag type, a storage unit adapted for storing the tag, the tag type, the subset of tag type attributes of the tag and associated tag type attribute values, and a trigger unit adapted for triggering a dynamically linkable executable program logic based on the subset of tag type attributes and the tag type attribute values stored in the storage unit.

It may be noted that the creating, relating, categorizing, registering and associating may be performed by means of a user interface. Furthermore, the subset of attributes may, in particular, comprise all attributes of a tag type. Thus, a tag, relating to a tag type, and the tag type itself may comprise an equal number of attributes, in particular, the same attributes.

The storing, as mentioned in context of the method, may be performed in a storage unit and/or a registry.

In the context of this application, the following conventions may be followed:

Tag and Tagging—In this context, tagging is the process of assigning keywords, also known as tags or, more generally speaking, metadata to resources. A tag itself may be a sort of metadata associated to a resource. A tag may denote a relevant non-hierarchical keyword or term that may be associated to a resource, e.g., a picture, a map, a blog entry, a video clip, and the like. Conventionally, the tag may have been chosen from an uncontrolled vocabulary, meaning that every user may select its own group of tags. A tag cloud may represent the visual depiction of the tags available in a system. Frequently applied tags may be displayed more prominently, e.g., with an increased font size, or blinking, or in a different color, in most of the cases.

Resource—The term resource may denote a uniquely identifiable or addressable entity, e.g., on the open Internet or a closed network. Tags—see above—may add valuable meta information to web resources. The resources may be accessible using a tag.

Categorizing of a tag—The term "categorizing a tag" may denote a process of relating a tag to a specific tag type.

Tag type—The term tag type may denote a specific type of a tag. In contrast to conventional tags, which belong all to one type of tag not allowing any differentiation, tag types may have a different set of attributes per tag type. Several of the attributes may overlap from tag type to tag type. These different attributes may be filled with different tag type attribute values. Thus, different tag types may differ in their attributes.

Registering—The term "registering" may denote a process of relating information items, e.g., a tag, a tag type, or program code, or any other resource in a registry.

Registry—A registry may denote a specific storage adapted to allow a registration as discussed above. Typically, a registry comprises an API (application programming interface) for such registering purposes.

Tag type attributes—The term tag type attribute may denote an attribute that may be related to a tag type. Tag type as well as tags may comprise different attributes. The attributes may be used to characterize a tag or a tag type.

Tag type attribute value—This term may denote a value that may be related to an attribute. An attribute may relate to different attribute values.

Dynamically linkable executable program logic—This term may denote a series of instructions that may be executed if activated. The instructions may be implemented in hardware or may be implemented in software.

Premium tag type—The term premium tag type may denote a tag type that may be characterized by a special attribute, the premium attribute. It may be set or reset. If the attribute has a related value characterizing it as "set", a related premium function of a tag may be triggered.

Function—The term function may denote functionality, e.g., related to a specific combination of tags and tag values. In a simple form, the function may, e.g., relate to the way a tag may be displayed. At the other end of the spectrum a function may invoke another function call, e.g., of a billing system, related to an order for goods or services or, a stock purchase order, just to name a few examples. In the end, every programmable behavior or action may be triggered by the function. The function may be executed by the executable programmable logic.

The proposed method for tagging a resource in a network may offer a couple of advantages.

The inventive method for tagging a resource may allow for a more sophisticated control of tag types. Conventionally, two fixed tag types are known: private tags and public tags. However, the here disclosed method allows for a usage of many more tags types. They may also be denoted as tag categories or tag classes. Each tag type may be characterized by a set of attributes qualified to influence a behavior of a tag that belongs to a certain class. This may be different characteristics in terms of security and/or access control, display modes, and/or certain actions that may be triggered depending on the tag type, its attributes, and values of the attributes as well as combinations thereof. A much more fine granular control of behaviors and related programmable execution logic that may be activated when accessing a tag may be provided. An activation of a tag may, e.g., be performed by a click on a tag with a pointing device in a user interface or, by simply hovering over it. Tag types may also be provided and loaded from an external source. Tags may belong to premium tag types which usage may activate a billing process. They may be turned into a new income stream for telecom or Internet providers.

In one embodiment of the method, an execution of the linkable executable program logic may be controlled by the tag type attribute values. By the execution, a behavior of a tag linked to the executable program logic may be defined, i.e., specific functions of the executable program logic may be influenced by the available tag types and their associated values. By this, a wide variety of different behaviors of the tag types and the tags may be influenced by the attributes and the attribute values. It may be mentioned that the term "execution" may also comprise a determination whether the execution may be started. In this sense, it may also comprise a triggering.

In a further embodiment of the method, at least one of the tag types may be a premium tag type which usage as for a tag may trigger a function in a billing system. Same as above, the related tags may be tags for a resource on the network. However, by using such a premium tag type, a billing function may be triggered. This may be done by assigning a tag to a premium tag type or, every time the related premium tag may be used, e.g., by clicking on it. This way a provider of Internet services may charge a monetary amount to the user who has used the premium tag. This opens up new income streams to Internet service providers. These providers may choose to download tag types and, in particular, premium tag types into related registries of users. Technically, an implementation may be done by using an extension point at the registry. Via extension point, characteristics of a premium or any downloaded tag or tag type may be loading into the registry making it extensible.

In again a further embodiment, the method may comprise also displaying an aggregated view of tags, such that display attribute values of the subset of tag type attributes influence the aggregated view of a subset of the tags and/or an individual view of the tag. A display attribute may be used to determine how a certain tag may be displayed in a user interface. There may, e.g., be a color attribute defining that a tag may display in a color different to a normal black color. A display attribute value may also define the actual display color of the tag. Similar influences may be performed for a blinking of the tag, and/or a font type and/or a font size.

In an enhanced embodiment, the method may also comprise creating the tag type before or during the creation of the tag. This may give a user freedom when a tag type may be defined. Also, tag types may be downloaded from an Internet provider to a user's tagging system. In that case, there may be a variety of tag types available without the requirement for a user to define his own tags. In a special case, the user may only choose from predefined tag types for tags he may create. The tag type definition may be performed by using a user interface, a programming interface, or a scripting interface. If tags and tag types may be created, the same extended tagging user interface may be used.

In a further enhanced embodiment, the method may also comprise receiving tag types via the network. In particular, the tag types may have been defined by an Internet service provider or, other users. Thus, an extendable group of tag types may be loaded from an extern source. For a user, it may not be required or he may not be able to create tag types. A special permission may be required for creating tag types. Premium tag types may be created by service providers only. In particular, also tag type attributes as well as tag type attribute values may be receivable over the network.

In another embodiment, the method may also comprise receiving the dynamically linkable executable program logic via the network. In particular, the executable program logic may be receivable from an Internet service provider. Because of the dynamical linkability of the executable program logic, it may be registered in the registry of the tagging system in a plug-able form or simply as a plug-in. It may then be performed after triggering. It may be related to tags and/or a group of tags characterized by a tag type. This way, the functions of the tagging system may be dynamically extendable or, in other words, their behavior may be adopted over the life time of the tagging system.

There may also be an enhanced version of the method, wherein the creation of the tag type may comprise comparing a newly created tag type—in particular, created by a user—with a predefined list of tag types, e.g., a so-called black list and/or white list. The black list may comprise unallowable tag types, while a white list may comprise a collection of allowable tags. In practical cases, one or the other list may be used. But there is no technical reason not to use both lists in parallel. This way, a tight control about tag types may be implemented in a system. Malfunctions may be prevented. Other forms of tag type validity checking may also be implemented, e.g., based on typographical functions or content-interpretative function based on lexica.

In an even more enhanced version of the method, the creation of the tag type may comprise blocking the creating of a new tag type based on the comparison, in particular the comparison with the above-mentioned lists. The same may be applicable for tag type attributes. Certain combinations of tag type attributes, chosen as subset, may not be allowable. They may result in technical conflicts, or other reasons may be present, such that the chosen combination may not make any practical sense. A simple example may be an attribute and an attribute value that defines the color of the tag to be white if the background color is also white. Too high blinking frequencies of a tag, or a font size that is too large for a certain screen size may also be prevented this way.

In one embodiment of the method, the method may also comprise triggering an action when activating a tag based on the tag type attribute values and the dynamically linkable executable program logic. The action may be triggered by clicking on a tag in a user interface or by just hovering over the tag. A wide variety of actions may be triggered. The triggering may either activate the dynamically linkable executable program logic, or other functions that may be implemented in hardware or software. It may trigger a purchase of company stocks, make a money transfer from one account to another, and may trigger an automatic sending of an e-mail, a reminder, or an order to a product or a service. Basically any function that may be triggered by means of a computer may be performed, executed or activated. Additionally, many other trigger functions may be performed, e.g., starting and stopping industrial production machines, controlling functionality of model railways, or instructing service robots to perform a certain task.

One embodiment of the tagging system may comprise an application programmable interface adapted for loading at least one out of the group consisting of a tag, a tag type, a tag type attribute for a predefined tag, tag type attribute value, and a dynamically linkable executable program logic into the registry. In a similar way, as described in the context of the method, this feature allows for an automated way of loading tag type, tag type attributes, as well as related tag type attribute values and also executable program logic into the registry. Depending on tag type, its attributes and values, the tagging system may be extended dynamically.

The tagging system may also be implemented as part of a computing system.

In another embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different sub-ject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All schemas in the figures are schematic. Firstly, a block diagram of an embodiment of the inventive method for tagging a resource in a network with tags belonging to tag types will be described. Afterwards, embodiments of the method, a tagging system and a computing system will be described.

FIG. 1 shows a block diagram 100 of an embodiment of the inventive method. A method 100 for tagging of a resource in a network may comprise creating, 102, a tag and relating, 104, the tag to the resource. The method may also comprise categorizing, 106, the tag into a tag type, registering, 108, the tag type in a registry, associating, 110, tag type attributes to the tag type, associating, 112, a subset of the tag type attributes of the tag type to the tag, and associating, 114, a tag type attribute value to each member of the subset of the tag type attributes of the tag. This may—in particular—be performed using a user interface (not shown). In particular, a different value may be assigned to each member of the subset of the tag type attributes of the tag. The method may also comprise storing, 116, the tag, the tag type, the subset of tag type attributes of the tag and associated tag type attribute values, in particular in a database, and triggering, 118, a dynamically linkable executable program logic based on the subset of tag type attributes and the tag type attribute values.

It may be clear to a skilled person that a tag may not need to have all attributes of a tag type, the tag may be associated to. The user may decide which attributes, and also which tag type attribute values, may be associated with a specific tag.

Figure 2:
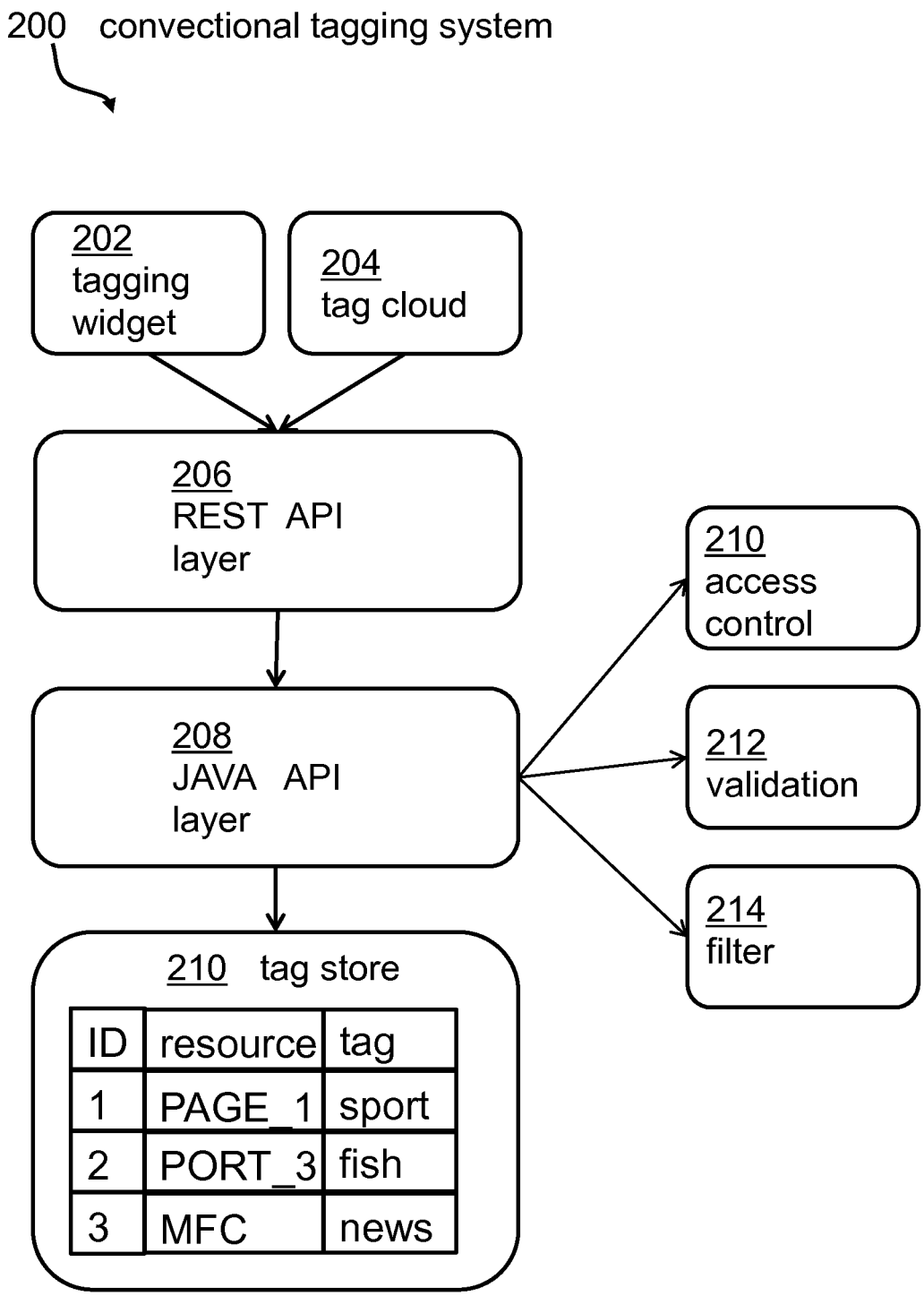
FIG. 2 shows a block diagram of an embodiment of a conventional tagging system.

FIG. 2 shows a block diagram of an embodiment of a conventional tagging system 200. A typical tagging system 200 comprises a tagging widget 202, as well as a tag cloud widget 204 running on the client web browser. The tagging widget 202 may allow displaying existing tags, to assign new tags or, removing existing tags. The tag cloud widget 204 may be displayed as an aggregated set of tags via a static list of views. A server side may provide a REST API 206 (REpresentational State Transfer Application Programming Interface). It may provide means for querying resources and/or tags, e.g., for a specific tag name and/or resource ID. The results may be returned via feeds. The REST API may be based on an API layer 208 written in JAVA or another programming language. The API layer 208 may provide means at a JAVA programming level to query resources and/or tags, e.g., specific tag names and/or resources. The JAVA API layer may access a data backend 210 storing the tags that have been and will be created by users interacting with the tagging system.

Furthermore, the API layer may interact with an access control component 210 for validating user tagging privileges, a validation component 212 adopted for checking whether the tag entered by the users may comply to a permissible allowed format, and a filtering component 214 in case a blacklist of whitelist filter may be used when creating tags.

Figure 3:
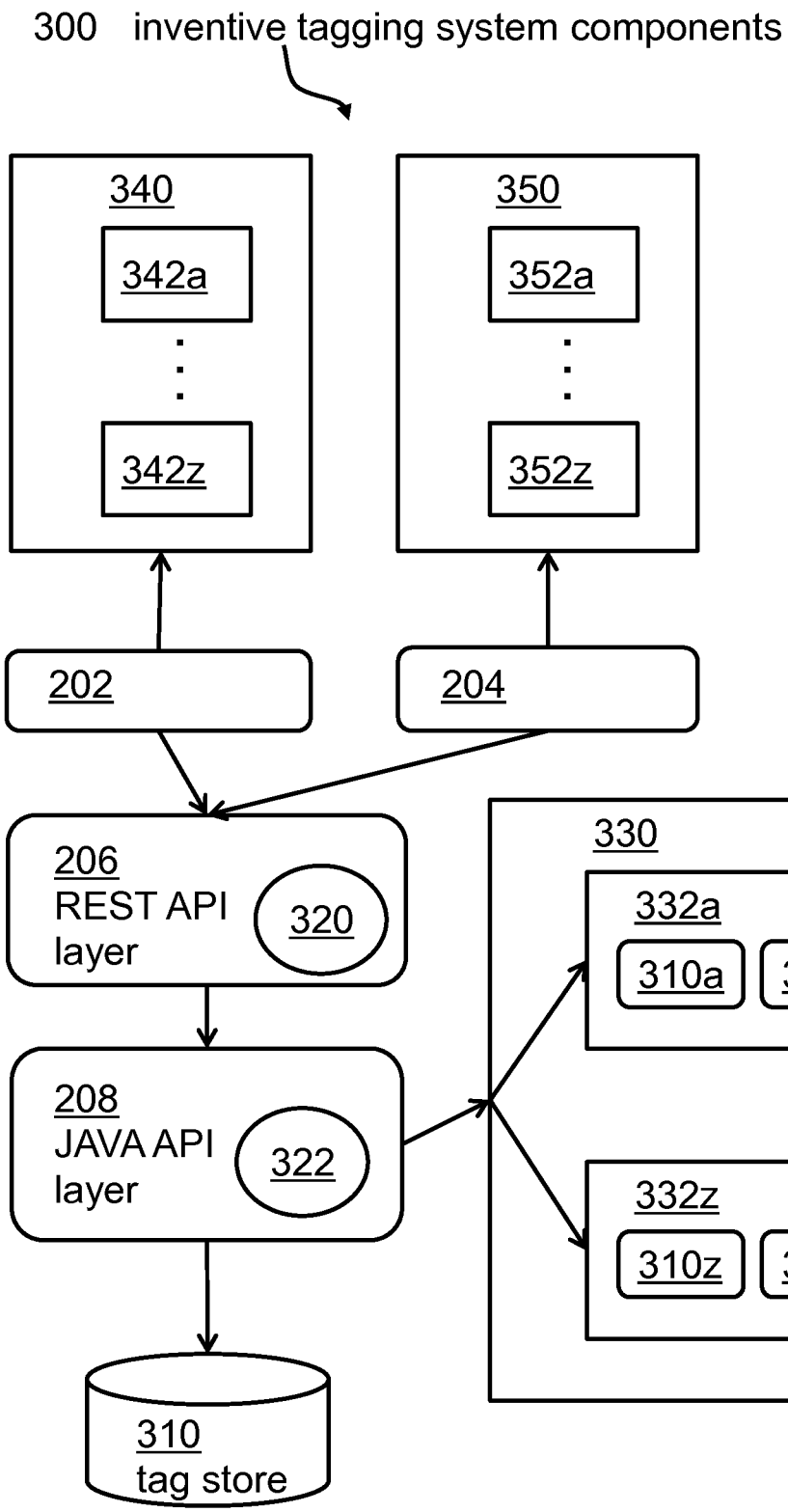
FIG. 3 shows a block diagram of an embodiment of structural components of the inventive tagging system.

FIG. 3 shows a block diagram 300 of an embodiment of structural components of the inventive tagging system tag. The tagging system 300 introduced by this invention may be based on the tagging widget extension container 340 and the tag cloud view container 350 on the client side and the tag type plug-in registry 330, and extended tag type query support 320, 322 on the server side.

The tagging widget extension container 340 is referenced and invoked by the tagging widget 202. It may comprise the tag type based tagging widgets 342a, 342b, . . . , 342z that may allow for creation of tags of type a, b, . . . , z. In addition, it may provide a selector for the end user that may allow for selection of the tag type to be used when creating new tags.

The tag cloud view container 350 is referenced and invoked by the tag cloud widget 204. It may comprise tags of different tag types 352a, 352b, . . . , 352z providing different visualizations for the available tag types a, b, . . . , z. The tag cloud view container 350 may allow for selecting different views based on the set of tag types available for the end user.

The tag type plug-in registry 330 may hold plug-in sets 332a, 332b, . . . , 332z for various tag types a, b, . . . z. Each of the plug-in sets may consist of an access control implementation 310i, a validation implementation 312i and a filter implementation 314i for the tag type i, i=a, . . . , z. New plug-in sets 310j may be registered in the tag type plug-in registry 330, as needed.

The previous REST layer 206 may be extended by tag type aware queries 320. Similarly, the previous JAVA API layer 208 may be extended by tag type aware JAVA query capabilities 322. A tag type aware data back-end 310 may replace the previously tag type unaware database.

Figure 4:
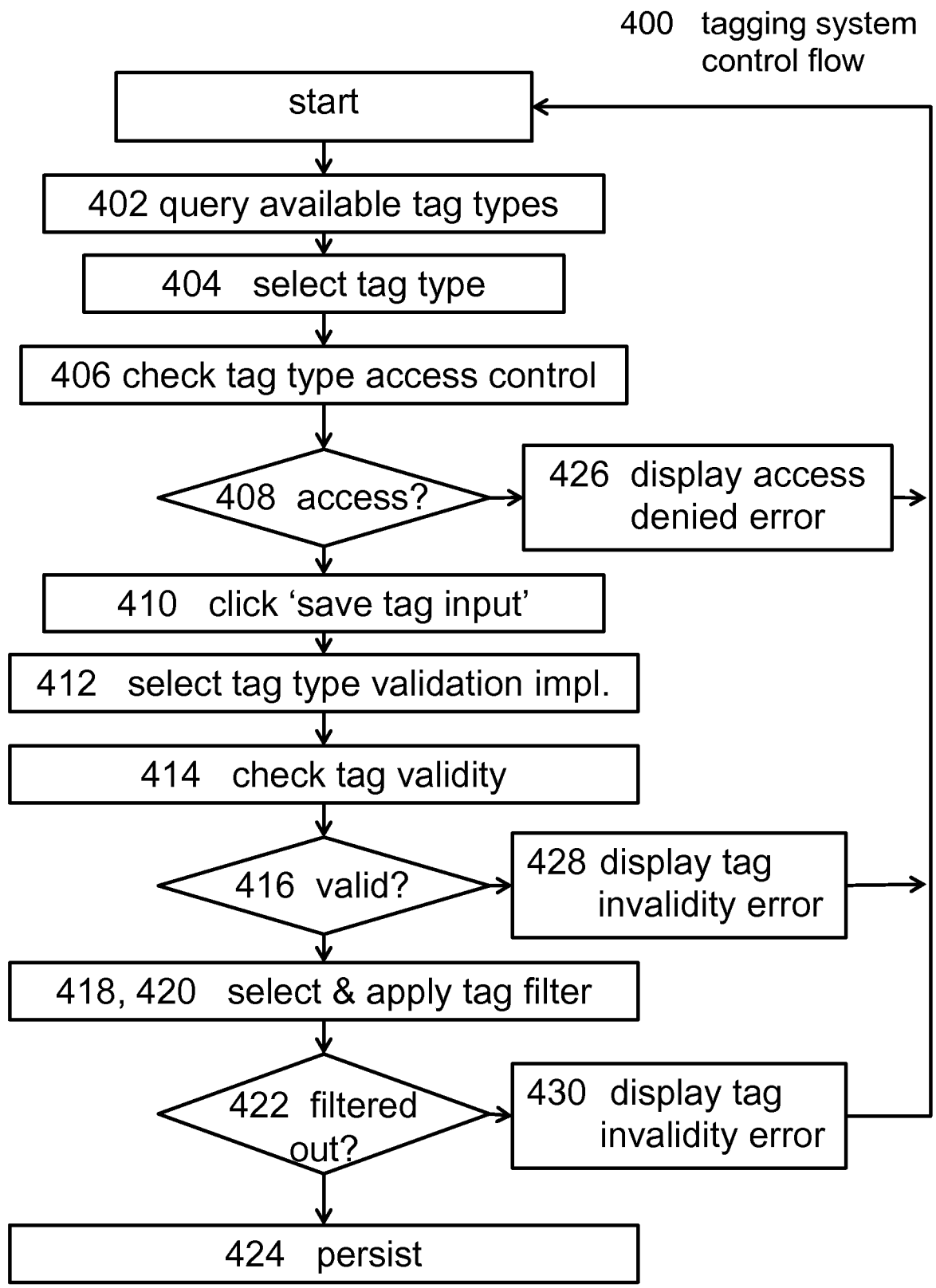
FIG. 4 shows a block diagram of an embodiment of a tag creation control flow.

FIG. 4 shows a block diagram of an embodiment of a tag creation control flow 400. Reference is also made to the structural components of the tagging system 300. A user may access the tagging system with the intent of creating a new tag. In step 402, the system queries all available tag types that have been registered in the tag type plug-in registry (FIG. 3, 330).

In the next step 404, the user may select the tag type he/she may want to create a tag for, out of the available tag types. As a result, an access control check 406, 408 is invoked in the back-end for the selected tag type i based on the access control implementation (FIG. 3, 310*i*) that may come along with the plug-in set (FIG. 3, 332*i*). In case the user does not have the privileges to create tags of the selected type, an informative "Access denied" message will be displayed 426 and the interacting user is directed back to the entry point of the system.

Given, the user may create a tag of the specific type, the next step is to type in the tag to be created and click, 410, a save button which will forward the user input to the next step.

Next, the registered validation implementation (FIG. 3, 312*i*) for the given tag type i may be selected, 412, from the plug-in set (FIG. 3, 332*i*). In step 414, the validation filter will subsequently check whether the user input may fulfill the requirements dictated by this validation filter. In case the user input may be detected as invalid, 416, an informative "Validation failed" message will be displayed, 428, and the user may be directed back to the entry point of the system.

Given, the validation is successful, the filter (FIG. 3, 314*i*) for the given tag type i may be selected, 418, and applied, 420, from the plug-in set (FIG. 3, 332*i*).

The selected filter may check whether the user input needs to be filtered out based on a blacklist or whitelist that may come along with the filter (FIG. 3, 314*i*). In case the user input has been filtered out by the filter 314*i*, 422 for tag type i, a "tag-filter-kicked-in" message 430 will be displayed to the end user, and he or she will be directed to the entry point 402 of the system.

Given the filter did not kick in, the typed tag may be persisted 424 in the new tag type aware data back-end.

Figure 5:
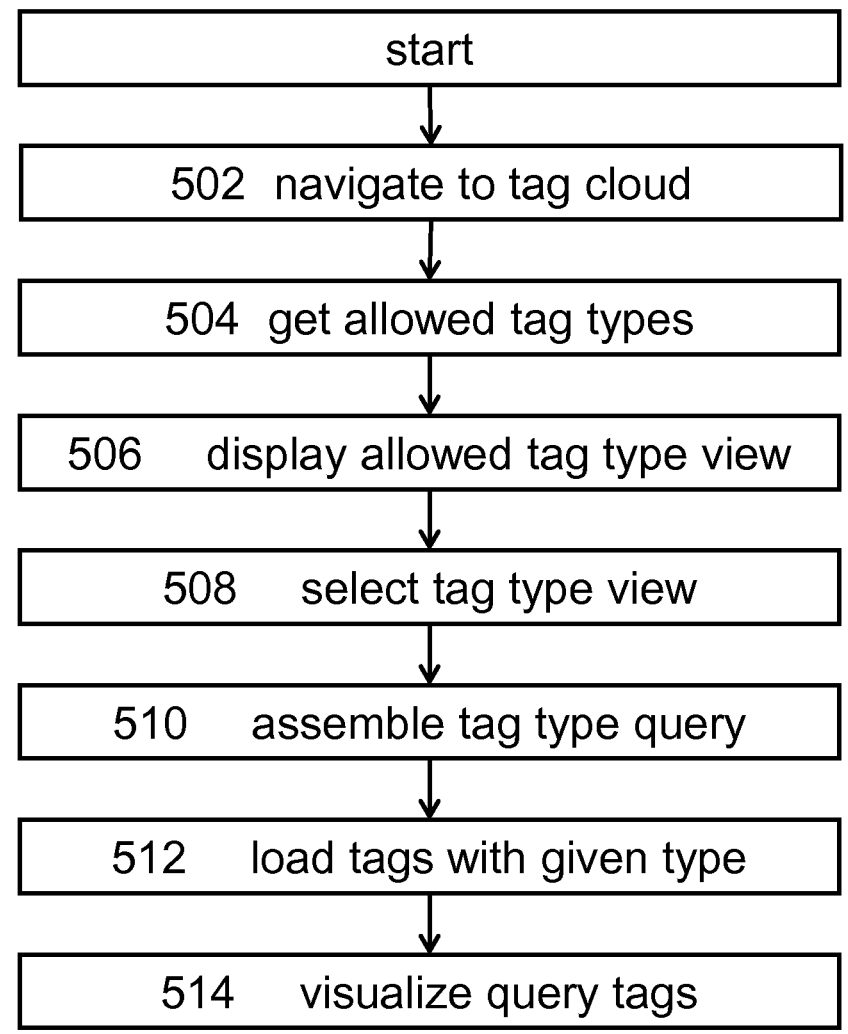
FIG. 5 shows a block diagram of an embodiment of a process of loading and displaying tags.

FIG. 5 shows a block diagram of an embodiment of a process of loading and displaying tags. Reference is also made to the control flow 400 (FIG. 4) of loading tags as well as the structural components of the tagging system 300 (FIG. 3).

A user may access the tagging system, step 502, in order to view/browse the tags via the tag cloud widget (FIG. 3, 204) he may know from conventional tagging systems. In the following, 504, all tag types, or a user defined-subset of them, the user may be allowed to view, may be displayed based on the access control implementations (FIG. 3, 310*a*, 310*b*, . . . , 310*z*) for all tag types that have been registered with the tag type plug-in aware registry (FIG. 3, 330). Also, other metrics, like the current context, may be used for a filtering of the displayed tag types. Just as one example, the cloud-based system may make use of rules like "display tag type T1 only if it is Monday".

The tag cloud widget 204 dispatches, 504, the information about the allowed tag types to the tag cloud view container 350 which in turn provides access to the tag visualization components 352*a*, 352*b*, . . . 352*z* for all tag types the user has access to. In step 506 they may be displayed.

In the next step 508, the end user may select a tag type view for tag type i he would like to see the tags for. This request is forwarded to the REST layer 206 enriched with tag type aware queries capabilities 320 and the JAVA API layer 208 with enriched tag type aware query capabilities 322, respectively.

In step 510, the layers assemble a tag type aware query which may be sent to the data backend in order to load tags with the given type for the said query, 512.

In step 514, the query results received from the tag aware data back-end 316 for tag type i may be sent to the selected tag type view 352*i* which renders the visual depiction of the result set provided by the submitted query.

Figure 6:
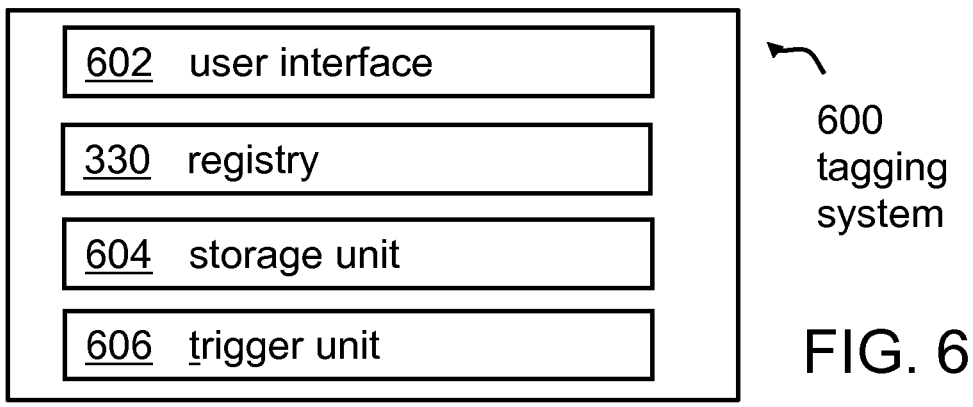
FIG. 6 shows an embodiment of the inventive tagging system.

FIG. 6 shows an embodiment of the inventive tagging system 600. The tagging system 600 for tagging a resource in a network with a tag belonging to a tag type may comprise a user interface 602 adapted for creating a tag and relating the tag to the resource. The user interface may also be adapted for categorizing the tag into a tag type, associating tag type attributes to the tag type, associating a subset of the tag type attributes of the tag type to the tag, and associating tag type attribute values to each member of the subset of the tag type attributes of the tag. The tagging system 600 may also comprise a registry 330 adapted for registering the tag type, a storage unit 604 adapted for storing the tag, the tag type, the subset of tag type attributes of the tag and associated tag type attribute values, and a trigger unit 606 adapted for triggering a dynamically linkable executable program logic based on the subset of tag type attributes and the tag type attribute values stored in the storage unit 606.

Figure 7:
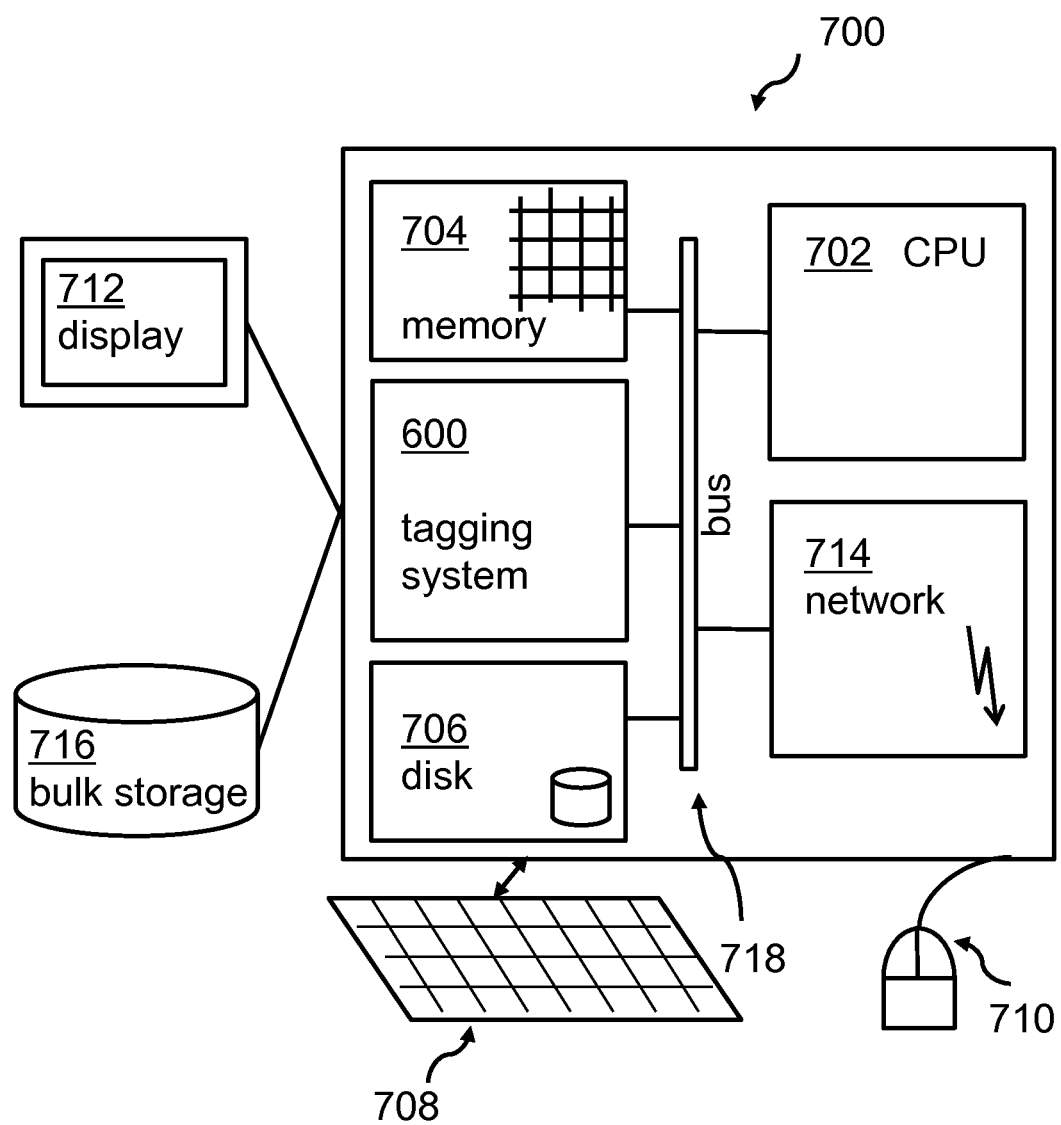
FIG. 7 shows an embodiment of a computing system comprising the tagging system.

Embodiments of the invention may be implemented together with virtually any type of computer and/or platform being suitable for storing and/or executing program code. For example, as shown in FIG. 7, a computing system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities, typical of today's computers (not shown). The memory elements 704 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, the tagging system 600 or tagging module may be attached to the bus system 718.

The computing system 700 may also include input means, such as a keyboard 708, a pointing device such as a mouse 712, or a microphone (not shown). Alternatively, the computing system may be equipped with a touch sensitive screen as main input device. Furthermore, the computer 700, may include output means, such as a monitor or screen 712 [e.g., a liquid crystal display (LCD), a plasma display, a light emitting diode display (LED, OLED), or cathode ray tube (CRT) monitor]. The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

Further, those skilled in the art will appreciate that one or more elements of the aforementioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

What is claimed is:

1. A method of tagging a resource in a network with a tag belonging to a tag type, the method comprising:
    creating, using a processor, a tag and relating the tag to the resource;
    categorizing the tag into a tag type;
    registering the tag type in a registry;
    associating tag type attributes to the tag type;
    associating a subset of the tag type attributes of the tag type to the tag;
    associating a tag type attribute value to each member of the subset of the tag type attributes of the tag;
    storing the tag, the tag type, the subset of tag type attributes of the tag, and associated tag type attribute values;
    triggering, using the processor, a dynamically linkable executable program logic based on the subset of tag type attributes and the tag type attribute values; and
    creating the tag type before or during the creation of the tag, wherein
    the creation of the tag type comprises comparing a newly created tag type with a predefined list of tag types, and
    the creation of the tag type comprises blocking the creating of a new tag type based on the comparison.

2. The method according to claim 1, wherein an execution of the linkable executable program logic is controlled by the tag type attribute values.

3. The method according to claim 1, wherein at least one of the tag types is a premium tag type that triggers a function in a billing system.

4. The method according to claim 1, further comprising:
    displaying an aggregated view of tags, such that display attribute values of the subset of tag type attributes influence at least one of the aggregated view of a subset of the tags or an individual view of the tag.

5. The method according to claim 1, further comprising:
    receiving tag types via the network.

6. The method according to claim 1, further comprising:
    receiving the dynamically linkable executable program logic via the network.

7. The method according to claim 1, further comprising:
    triggering an action when activating a tag based on the tag type attribute values and the dynamically linkable executable program logic.

8. A system for tagging a resource in a network with a tag belonging to a tag type, comprising:
    a hardware processor programmed to initiate executable operations comprising:
        creating a tag and relating the tag to the resource;
        categorizing the tag into a tag type;
        registering the tag type in a registry;
        associating tag type attributes to the tag type;
        associating a subset of the tag type attributes of the tag type to the tag;
        associating a tag type attribute value to each member of the subset of the tag type attributes of the tag;
        storing the tag, the tag type, the subset of tag type attributes of the tag, and associated tag type attribute values;
        triggering a dynamically linkable executable program logic based on the subset of tag type attributes and the tag type attribute values; and
        creating the tag type before or during the creation of the tag, wherein
    the creation of the tag type comprises comparing a newly created tag type with a predefined list of tag types, and
    the creation of the tag type comprises blocking the creating of a new tag type based on the comparison.

9. The system according to claim 8, wherein an execution of the linkable executable program logic is controlled by the tag type attribute values.

10. The system according to claim 8, wherein at least one of the tag types is a premium tag type that triggers a function in a billing system.

11. The system according to claim 8, wherein the hardware processor is further programmed to initiate an executable operation comprising:
    displaying an aggregated view of tags, such that display attribute values of the subset of tag type attributes influence at least one of the aggregated view of a subset of the tags or an individual view of the tag.

12. The system according to claim 8, wherein the hardware processor is further programmed to initiate an executable operation comprising:
    receiving tag types via the network.

13. The system according to claim 8, wherein the hardware processor is further programmed to initiate an executable operation comprising:
    receiving the dynamically linkable executable program logic via the network.

14. The system according to claim 8, wherein the hardware processor is further programmed to initiate an executable operation comprising:
    triggering an action when activating a tag based on the tag type attribute values and the dynamically linkable executable program logic.

15. A computer program product for tagging a resource in a network with a tag belonging to a tag type, comprising:
    a hardware storage device having program code stored thereon,
    the program code, which when executed by a processor, causes the processor to perform:
        creating, using the processor, a tag and relating the tag to the resource;
        categorizing, using the processor, the tag into a tag type;
        registering, using the processor, the tag type in a registry;
        associating, using the processor, tag type attributes to the tag type;
        associating, using the processor, a subset of the tag type attributes of the tag type to the tag;

associating, using the processor, a tag type attribute value to each member of the subset of the tag type attributes of the tag;

storing, using the processor, the tag, the tag type, the subset of tag type attributes of the tag, and associated tag type attribute values;

triggering, using the processor, a dynamically linkable executable program logic based on the subset of tag type attributes and the tag type attribute values; and creating the tag type before or during the creation of the tag, wherein the creation of the tag type comprises comparing a newly created tag type with a predefined list of tag types, and the creation of the tag type comprises blocking the creating of a new tag type based on the comparison.

16. The computer program product according to claim 15, wherein an execution of the linkable executable program logic is controlled by the tag type attribute values.

17. The computer program product according to claim 15, wherein at least one of the tag types is a premium tag type that triggers a function in a billing system.

18. The computer program product according to claim 15, wherein the method further comprises:

displaying an aggregated view of tags, such that display attribute values of the subset of tag type attributes influence at least one of the aggregated view of a subset of the tags or an individual view of the tag.

* * * * *